United States Patent
Li et al.

(10) Patent No.: US 12,412,151 B2
(45) Date of Patent: Sep. 9, 2025

(54) MACHINE LEARNING ASSISTED ALERTS FOR ITEM PICKING

(71) Applicant: Maplebear Inc., San Francisco, CA (US)

(72) Inventors: Shang Li, Jersey City, NJ (US); Ashish Sinha, Jersey City, NJ (US); Krishna Kumar Selvam, San Francisco, CA (US); Qi Xi, New York, NY (US); Amirali Darvishzadeh, San Jose, CA (US); David Zandman, San Francisco, CA (US); Christopher Billman, Chicago, IL (US)

(73) Assignee: Maplebear Inc., San Francisco, CA (US)

( * ) Notice: Subject to any disclaimer, the term of this patent is extended or adjusted under 35 U.S.C. 154(b) by 158 days.

(21) Appl. No.: 18/498,016

(22) Filed: Oct. 30, 2023

(65) Prior Publication Data
US 2025/0139574 A1    May 1, 2025

(51) Int. Cl.
*G06Q 10/087* (2023.01)
*G06N 5/022* (2023.01)

(52) U.S. Cl.
CPC ........... *G06Q 10/087* (2013.01); *G06N 5/022* (2013.01)

(58) Field of Classification Search
CPC ....... G06Q 10/087; G06N 5/022; G06N 3/084
USPC ........................................................... 705/28
See application file for complete search history.

(56) References Cited

U.S. PATENT DOCUMENTS

| | | | |
|---|---|---|---|
| 11,676,098 B2 * | 6/2023 | Berti | G06F 21/6209 705/28 |
| 11,983,641 B2 * | 5/2024 | Brebner | G06F 8/315 |
| 2019/0354922 A1 * | 11/2019 | Berti | G06K 7/1417 |

FOREIGN PATENT DOCUMENTS

| | | | | |
|---|---|---|---|---|
| JP | 2024500818 A | * | 1/2024 | |
| JP | 2024517412 A | * | 4/2024 | G06Q 10/087 |

* cited by examiner

*Primary Examiner* — Russell S Glass
(74) *Attorney, Agent, or Firm* — Fenwick & West LLP

(57) ABSTRACT

A machine-learned predictive model is trained to predict potential for customer complaint. The model is part of an online concierge system. The online concierge system accesses a customer order that includes one or more items. The online concierge system determines input data for an item of the one or more items. The online concierge system determines a prediction value associated with potential for customer complaint for the item by applying the machine-learned prediction model to the input data. The online concierge system provides the prediction value to a picker client device associated with a picker who is assigned the item. The picker client device presents an alert to the picker based in part on the prediction value, and the alert includes a message that is customized to mitigate a cause of potential customer complaint for the item.

20 Claims, 5 Drawing Sheets

MACHINE LEARNING ASSISTED ALERTS FOR ITEM PICKING

BACKGROUND

Conventional online concierge systems have pickers fulfill orders for items from customers at various retailers. However, some items tend to result in a larger number of customer complaints than others. For example, items that have an expiration date have a chance of being expired and/or spoiled when selected by a picker. And if the picker inadvertently selects an expired item and it is delivered to the customer, it can negatively impact the customer's experience and may result in some form of appeasement (e.g., replacement item, credit, etc.) being made to the customer to compensate for delivery of the expired item. However, there are no technical mechanisms to predict likely problems and then alert pickers about the likely problems.

SUMMARY

In accordance with one or more aspects of the disclosure, one or more machine-learned predictive models are used to assist in determining whether quality should be provided to a picker for one or more items.

An online concierge system is configured to access customer orders that are assigned to various picker client devices that are associated with different pickers. Each customer order may include a respective set of one or more items. For a given customer order that includes one or more items, the online concierge system may be configured to determine input data (e.g., identifier for the item) for some or all of the one or more items. The online concierge system may determine prediction values for some or all of the one or more items by applying one or more machine-learned prediction models to the input data. The one or more machine-learned predictive models may be part of the online concierge system.

The one or more machine-learned predictive models may be trained to predict potential for customer complaints for a given item. The one or more machine-learned predictive models may be trained by accessing a training data set including item identifiers for a plurality of items including the item and instances of customer complaint for the plurality of items. The one or more machine-learned predictive models may be applied to the training data to generate training output. One or more error terms may be backpropagated, and the one or more error terms may be obtained from one or more loss functions to update one or more sets of parameters of the one or more machine-learned predictive models. One or more of the error terms may be based on a difference between a label applied to an item of the training data and a predicted probability of receiving a customer complaint for that item. The backpropagation may be stopped after the one or more loss functions satisfy one or more criteria.

The online concierge system may provide the determined prediction values to a picker client device associated with the one or more items of the given customer order. The picker client device may determine whether any items should have an alert based in part on the prediction values. Based in part on a comparison between each item with at least one received prediction value and a corresponding threshold value for the item, the picker client device may determine whether an alert should be generated for that item, and generate alerts for those items. The picker client device presents the generated alerts. In some embodiments, the picker client device automatically presents the generated alert (e.g., as part of the collection interface) for an item. In other embodiments, the picker client device and/or the online concierge system monitors one or more presentation criteria (e.g., a location of the item), and once the one or more presentation criteria are satisfied, the picker client device presents the generated alert for the item.

DETAILED DESCRIPTION

Figure 1:
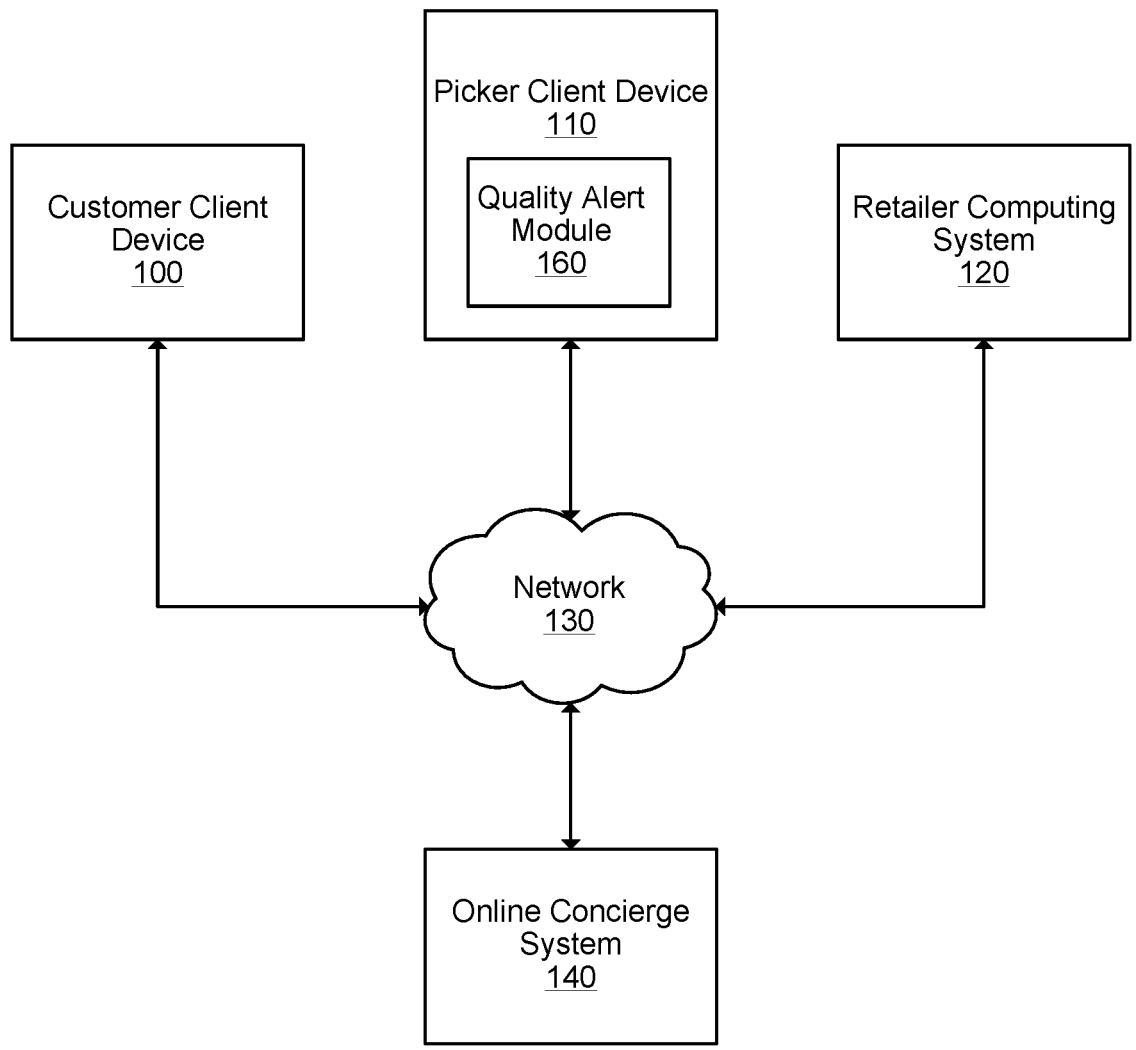
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140. The picker client device 110 includes a quality alert module 160.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Note that for some items, there is a higher chance of a customer submitting a customer complaint. Customer complaints also generally are associated with a negative customer experience and may result in some sort of appeasement being made to the customer (e.g., refund, replacement item, credit, etc.). Some types of issues where this can occur are when an item is missing from an order, the wrong item is delivered, an unsatisfactory (poor) replacement item was delivered, an item is expired, an item is rotten, an item is damaged, temperature spoilage occurred, etc. Some other factors that can affect whether a customer files a complaint are, e.g., the experience level of the picker (e.g., experienced picker may be more likely to notice that an item is expired), as well as the customer's personality (e.g., are they generally ok with substitutions or do they always want exactly what is ordered). As such, there are many factors that can potentially negatively impact the customer experience and/or result in appeasement being made for an item.

The quality alert module 160 is configured to present alerts to the picker for select items to mitigate potential instances of customer complaint. The quality alert module 160 may use alerts to, e.g., remind the picker to pay particular attention in, e.g., a selection of the item (e.g., ensure it has not expired, spoiled, etc.), transportation of the item (e.g., on a hot day not leaving butter in a part of a vehicle without climate control), delivery of the item, etc. In this manner, the quality alert module 160 can mitigate issues which can potentially negatively impact the customer experience and/or potentially result in appeasement for the item.

The quality alert module 160 is configured to present alerts to the picker for items based in part on prediction values. In some embodiments, the quality alert module 160 receives prediction values from the online concierge system 140 via the network 130 for one or more (or in some cases all) of the items on the order. The quality alert module 160 may receive the prediction values for items in serial (e.g., as a function of a user's location, next item on the order to select), in batch (multiple prediction values received together), or some combination thereof. In some embodiments, a single prediction value for an item may be received. In other embodiments, multiple prediction values may be received for an item, where each prediction value is associated with a different type of issue. An issue is a category associated with customer complaints. An issue type may be, e.g., item missing, wrong item, poor replacement, rotten, expired, damaged, temperature spoiled, uncategorized, some other category associated with customer complaints, or some combination thereof.

Whether an alert is presented for an item is based in part on a threshold value. As such, each item may be associated with at least one threshold value. In some embodiments, the threshold value is the same for all items. In other embodiments, there are separate threshold values for different items and/or different types of issues. The separate threshold values may be different or the same from threshold values for other items and/or types of issues. For example, each item may have multiple threshold values that are associated with different types of issues (e.g., an item may have a first threshold value for a first type of issue (e.g., wrong item) and a second threshold value for a second type of issue (e.g., expired)). In some embodiments, the threshold values for items are received from the online concierge system 140.

The quality alert module 160 may compare, for each item with at least one received prediction value, the at least one prediction value for the item against a corresponding threshold value for the item. In some cases, the quality alert module 160 selects a threshold value for the item based in part on the received prediction value. For example, if the prediction value is for a first type of issue (e.g., wrong item), the quality alert module 160 selects a threshold value associated with the first type of issue. Based on one or more comparisons of a prediction value to a threshold value, the quality alert module 160 determines whether one or more alerts should be presented. For example, the comparison may be such that if the prediction value exceeds the threshold value, the quality alert module 160 determines that an alert should be presented.

The quality alert module 160 generates alerts for presentation to the picker. The alert includes a message (e.g., for presentation as part of the collection interface) that is customized to mitigate a cause of potential customer complaint for the item. In some embodiments, the alert may also include a sound (e.g., chime) and/or haptic feedback to be presented via the picker client device 110 while it presents the alert. In some embodiments, the message is received from the online concierge system 140. In other embodiments, quality alert module 160 selects a message from a plurality of messages. The selection may be based on, e.g., the type of issue (e.g., item missing, wrong item, etc.) associated with the item. For example, if the item is butter it may be prone to temperature spoilage—the message may remind the picker to avoid high temperature (e.g., as would occur in a trunk in Phoenix, Arizona during the summer) during transport. In another example, an item has an expiration date (e.g., issue type of expired), and the message may remind the picker to make sure the item has not expired. A message may be, e.g., "Make sure it's not expired, rotten, or spoiled").

In some embodiments, if the quality alert module 160 determines an alert should be presented, the quality alert module 160 automatically generates the alert and presents the generated alert (e.g., as part of the collection interface). In other embodiments, if the quality alert module 160 determines an alert should be presented, the quality alert module 160 presents a generated alert subject to satisfying one or more presentation criteria. Presentation criteria are conditions for an alert to be presented, that once met, the quality alert module 160 presents the alert. Presentation criteria may include, e.g., a location of the picker client device 110, an item the picker client device 110 is routing the picker to for selection, a time of day, less than a threshold number of alerts being presented for the order, less than a threshold number of alerts being presented for a time period, an operational stage of the order (e.g., picker shopping, picker transport of selected items, picker providing selected items to other entity, picker delivery of selected items to customer).

For example, the picker client device 110 may hold on presenting an alert for an item until the picker client device 110 displays that item as the next to be selected (e.g., as shown and described below with regard to FIG. 3). In this manner, the picker may receive in near real time a reminder to e.g., select an item that is not expired as they are actively making a selection for that item.

Note that items with large sizes (e.g., large packs of paper towels) that do not fit in delivery bags sometimes are inadvertently left in a picker's vehicle when a picker delivers items to fulfill a customer order and/or when providing the items to another entity for delivery to the customer (particularly when the picker has multiple orders in the trunk so that it may not be as apparent which order items outside of a delivery bag belong to). In another example, the quality alert module 160 may have determined that an alert should be presented for an item (e.g., large pack of paper towels) during a delivery stage for the item. The quality alert module 160 may monitor a location of the picker client device 110, and once the picker client device 110 is within a threshold distance (e.g., 300 feet) of a delivery location (e.g., 50 feet) for the order including the item, the quality alert module 160 may instruct the picker client device 110 to present the alert for the item. In this manner, the picker can receive a near real-time reminder to grab the item along with the other items for delivery to help avoid, e.g., a missing item issue with the delivery.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140.

The online concierge system 140 works with the quality alert modules 160 on picker client devices 110 to ensure alerts are timely provided to pickers for select items. The online concierge system 140 accesses customer orders, and uses information from the customer orders and one or more machine-learned prediction models to determine prediction values for some or all of the items in those orders. The online concierge system 140 provides the determined prediction values to the appropriate picker client devices 110. In some embodiments, the online concierge system 140 may also provide messages to provide as part of the alerts. In some embodiments, some of the functionality of the quality alert module 160 may be performed by the online concierge system 140. For example, the online concierge system 140 may determine whether an alert should be generated, generate the alert, and provide the alert to the picker client device 110 for presentation. The online concierge system 140 is described in further detail below with regards to FIG. 2.

Figure 2:
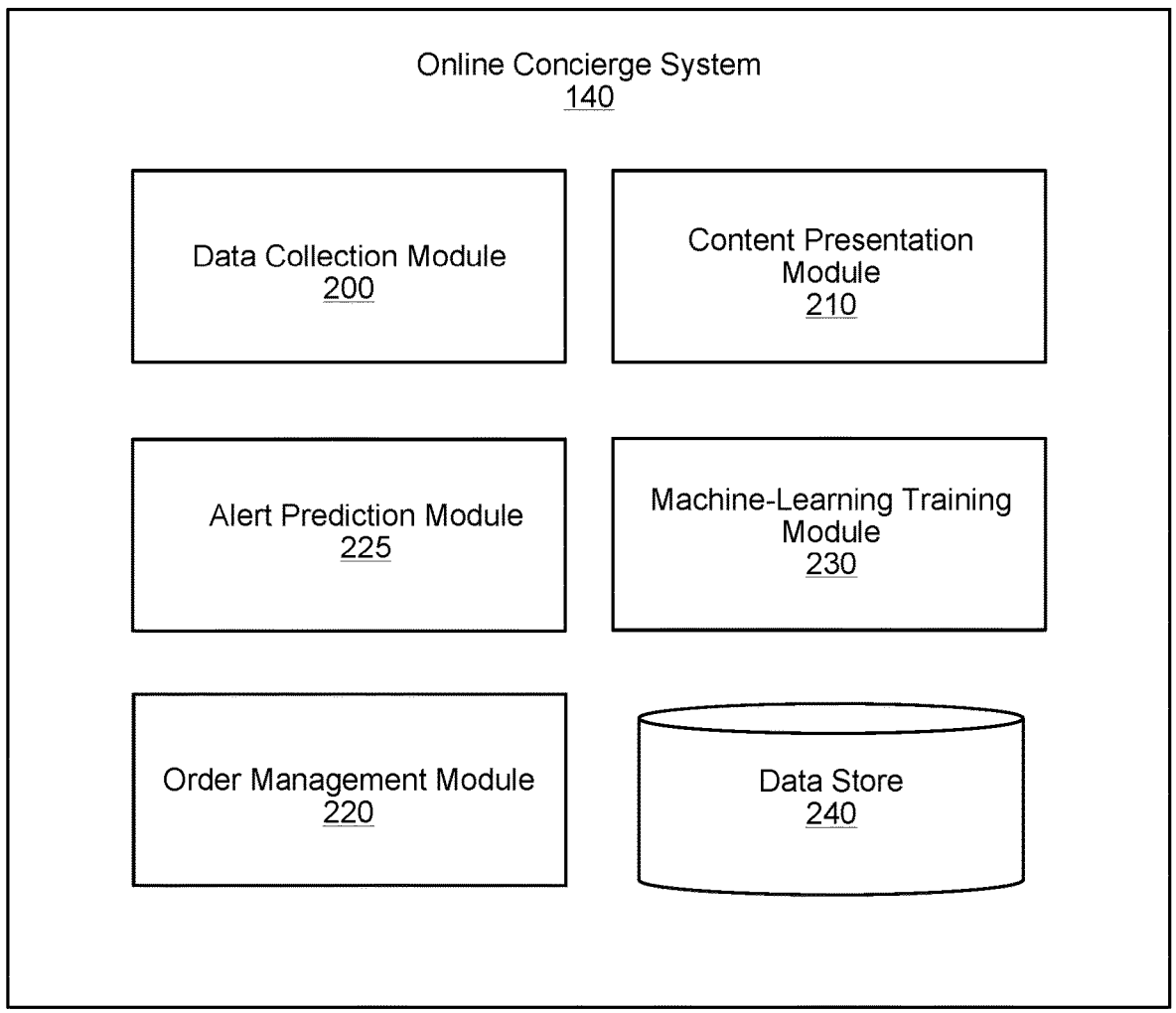
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, an alert prediction module 225, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention. Additionally, in some embodiments, functionality of some of the modules may be performed by the picker client devices 110. For example, some aspects of the alert prediction module 225 may be performed by the picker client devices 110.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer identifier that identifies characteristics of the customer, a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. Item data may include an identifier that identifies characteristics of the item. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include a picker identifier that identifies characteristics of the picker, the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The alert prediction module 225 works with the quality alert modules 160 on picker client devices 110 to ensure alerts are timely provided to pickers for select items. The online concierge system 140 accesses customer orders. For example, for received orders, the online concierge system 140 may extract from the received orders item identifiers for items that are part of the received orders.

The alert prediction module 225 determines prediction values associated with items by applying one or more machine-learned prediction models to input data associated with the one or more items. A prediction value is a value associated with a potential for a customer complaint occurring for a specific item. Input data are one or more features that input into the one or more machine-learned prediction models to facilitate generation of a prediction value for an item. Input data associated with the item may include, e.g., item data (e.g., an item identifier that identifies characteristics of the item), customer data (e.g., a customer identifier that identifies characteristics of a customer associated with a client device that provided the customer order), picker data (e.g., a picker identifier that identifies characteristics of the picker), order data, a cost price per unit, an item damage rate, a warehouse damage rate, a user damage rate, a picker damage rate, a product damage rage, time of date (local), some other feature that may facilitate generation of a prediction value for an item, or some combination thereof. In some embodiments, the alert prediction module 225 may fetch one or more of the input data (e.g., an item damage rate) from, e.g., the data store 240, based on the item identifier.

In some examples, the one or more machine-learned prediction model is a single machine-learned prediction model configured to generate prediction values for items for the plurality of different types of issues (e.g., wrong item, missing item, etc.). In some embodiments, for a given item, there is a separate prediction value for each type of issue. In other embodiments, for the given item, there is a single prediction value that covers all of the types of issues. In other embodiments, the one or more machine-learned prediction model is plurality of machine-learned prediction models that are respectively associated with at least one type of issue. For example, one machine-learned prediction model may be used to determine prediction values for a first type of issue (e.g., wrong item), and another machine-learned prediction model may be used to determine prediction values for a second type of issue (e.g., rotten).

In some embodiments, the alert prediction module 225 determines prediction values for all types of issues. In other embodiments, the alert prediction module 225 may determine prediction values for a subset of the types of issues. For example, if the item does not have a shelf life, the alert prediction module 225 may not determine prediction values for expiration. As such, in some embodiments, the alert prediction module 225 may be configured to determine one or more types of issues associated with an item. The alert prediction module 225 may select one or more machine-learned prediction models associated with the determined one or more types of issues from a plurality of machine-learned prediction models that are associated with different types of issues.

In some embodiments, the alert prediction module 225 instructs the order management module 220 to select a picker for an order and/or a subset of an order based on prediction values associated with items in the order and/or prediction values associated with items in the subset of the order. For example, if there are more than a particular number of items in an order with prediction values above a threshold value (i.e., would result in generation of an alert) the alert prediction module 225 may instruct the order management module 220 to assign (or re-assign) the order to a picker of at least a threshold experience level (e.g., 1 year). In this manner, the alert prediction module 225 mitigates instances of difficult orders being assigned to inexperienced pickers which would more likely result in customer complaints.

The online concierge system 140 provides the determined prediction values to one or more picker client devices 110 who are associated with the one or more items. The one or more picker client devices 110 determine whether to present one or more alerts to their respective picker using the received prediction values and corresponding threshold values. Each alert for an item includes a message that is customized to mitigate a cause of potential customer complaint for the item. The online concierge system 140 may also provide the corresponding threshold values to the one or more picker client devices 110. For example, the online concierge system 140 retrieves threshold values from the data store 240 (e.g., using item identifiers) and provides the retrieved threshold values to the one or more picker client devices 110. An administrator of the online system may set the thresholds to balance between false positives (i.e., incorrectly predicting a customer compliant) and false negatives (e.g., failing to predict an actual future customer complaint), thereby mitigating customer complaints without unduly burdening a picker with unhelpful alerts.

In some embodiments, the online concierge system 140 may use guardrail metrics to control whether an alert is presented to a picker. For example, if a picker is receiving alerts for every item, not only can it reduce the efficacy of the alert and potentially increase delivery costs, but it also can have a negative impact on the picker experience. The online concierge system 140 can address this by, e.g., using one or more guardrail metrics to limit numbers of alerts provided to pickers. Guardrail metrics may include, e.g., mean picking time per order, picker satisfaction survey results, labor costs per delivery, etc. Accordingly, the online concierge system 140 may limit a number of alerts provided to a picker (e.g., for a particular order, for a particular time range, etc.) to satisfy one or more guardrail metrics. In some embodiments, the online concierge system 140 may dynamically adjust the limit of alerts based in part on values of the one or more guardrail metrics. For example, if a picking time for a picker is higher than the mean picking time, the online concierge system 140 may reduce a number of alerts that can be sent to the picker for a given time period. In some embodiments, the online concierge system 140 reduces instances of alerts by simply adjusting prediction values for one or more items such that they do not satisfy the comparison for an alert to be generated at the picker client device 110. In other embodiments, the online concierge system 140 reduces instances of alerts by not sending prediction values for some of the items.

In some embodiments, the online concierge system 140 may use one or more success metrics to quantify how well, directly or indirectly, the alerts are mitigating potential for customer complaints. A success metric may include, e.g., an appeasement amount (e.g., in dollars) per order for a damaged item, an appeasement amount per order, an appeasement cost per delivery, a star rating from the customer, some other metric that directly or indirectly quantifies how well the alerts are mitigating potential for customer complaints, or some combination thereof. In some embodiments, the online concierge system 140 may use one or more monitoring metrics to monitor alerts generated. Monitoring metrics may include, e.g., a number of alerts per order, a number of orders with item alerts, or a percentage of false negatives.

Note that the online concierge system 140 may use values of one or more of the guardrail metrics, values of one or more of the success metrics, values of one or more of the monitoring metrics to train the one or more prediction models, set threshold values, set limits for alerts, or some combination thereof. In this manner, the online concierge system 140 is able to balance positive customer experience (and mitigate chances of customer complaint) against excess number of alerts and potential for reduced picker experience.

Note in some embodiments, the online concierge system 140 may perform some of the functions described above for the quality alert module 160. For example, in some embodiments, the online concierge system 140 may select a message (e.g., using a process similar to that described above for the quality alert module 160) to include in an alert and provide the selected message to the picker client device 110.

The machine learning training module 230 trains machine learning models used by the online concierge system 140 (e.g., the one or more machine-learned predictive models). The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. For example, a machine-learned prediction model may be a gradient boost tree model. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains one or more machine learning models including one or more machine learning prediction models based on a set of training examples. Each training example includes training input data to which the machine learning model (e.g., a machine-learned predictive model) is applied to generate an output. For example, each training example may include customer data, picker data, item data, order data, a cost price per unit, an item damage rate, a warehouse damage rate, a user damage rate, a picker damage rate, a product damage rage, time of date (local), instances of customer complaints for items, various types of issues, some other feature that may facilitate generation of a prediction value for an item, or some combination thereof. The various types of issues include, e.g., item missing, wrong item, poor replacement, rotten, expired, damaged, temperature spoiled, uncategorized, some other category associated with customer complaints, or some combination thereof. One or more training examples may be referred to as a training data set. In some cases, the training examples also include a label which represents an expected output of the machine learning model. In these cases, the machine learning model is trained by comparing its output from input data of a training example to the label for the training example.

In some embodiments, a single machine-learned prediction model is trained to generate prediction values for items for all types of types of issues (e.g., wrong item, missing item, etc.). In other embodiments, a plurality of different machine-learned prediction models are trained that are respectively associated with different issues (e.g., each model is associated with one or more issues that are different from issues associated with other models). In some embodiments, a different machine-learned prediction model is trained for each issue.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. In some embodiments, one or more errors terms obtained from one or more loss functions are backpropagated to update a set of parameters of the machine-learned prediction model. In some embodiments, one or more of the error terms may be based on a difference between a label applied to an item of the training data and a predicted probability of receiving a customer complaint for that item. In some embodiments, the backpropagation is stopped after the one or more loss functions satisfy one or more criteria. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, picker data, other input data, prediction values for items, and threshold values for items, for use by the online concierge system 140. The data store 240 also stores trained machine learning models (e.g., one or more machine-learned prediction models) trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
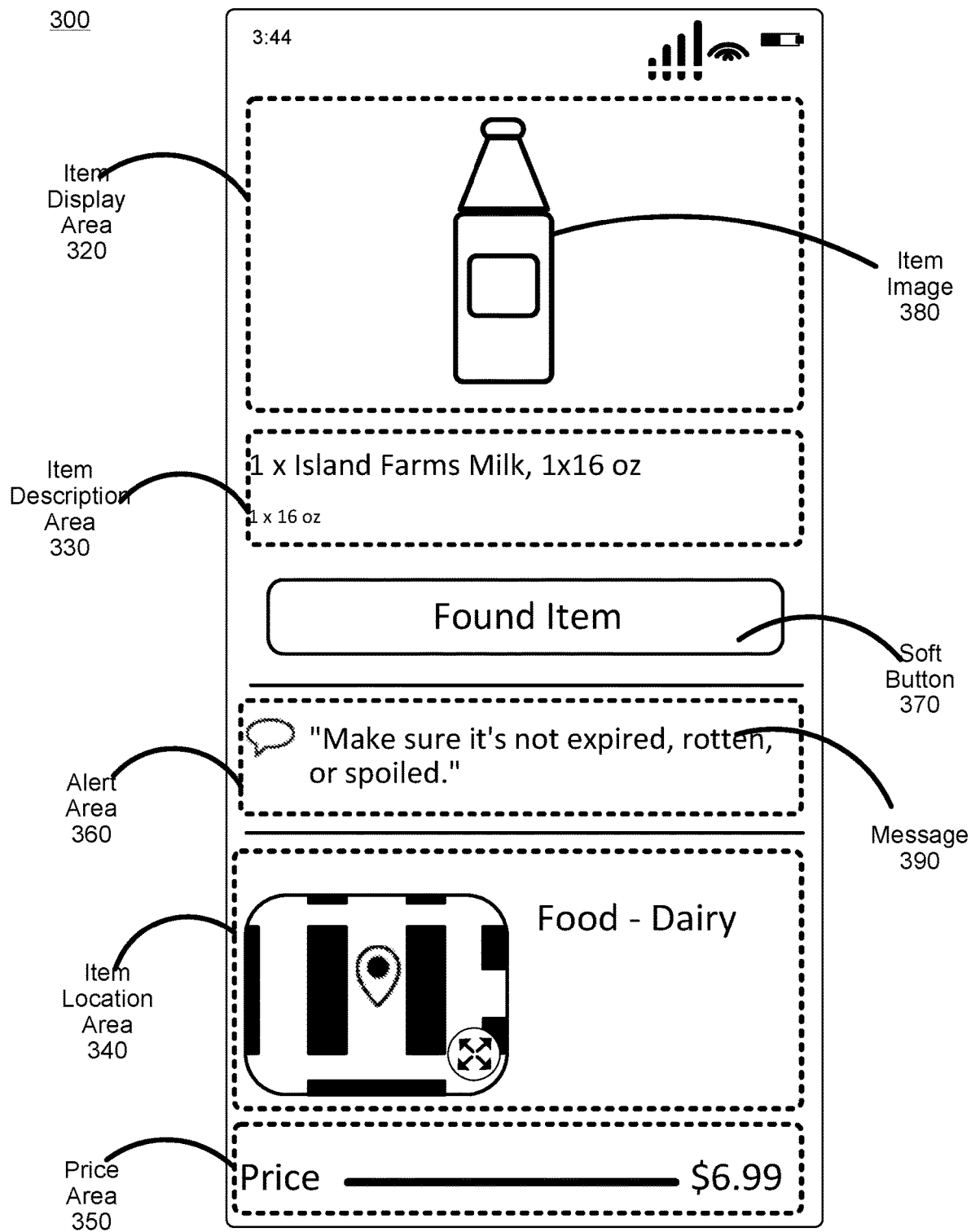
FIG. 3 illustrates an example collection interface presenting a message of an alert, in accordance with some embodiments.

FIG. 3 illustrates an example collection interface 300 presenting a message 310 of an alert, in accordance with some embodiments. The collection interface 300 is an embodiment for the collection interface described above with regard to FIG. 1. The collection interface 300 may be presented on a picker client device (e.g., the picker client device 110). The collection interface 300 is a user interface that provides information to the picker on which items to collect for a customer's order and the quantities of the items.

In the illustrated embodiment, the collection interface 300 includes an item display area 320, an item description area 330, an item location area 340, a price area 350, an alert area 360, and a soft button 370. In other embodiments, the collection interface 300 includes different or additional elements. In addition, the functions may be distributed among the elements in a different manner than described.

The item display area 320 presents one or more images of an item. For example, as shown the item display area 320 presents an item image 380. In the illustrated embodiment, the item display area 320 is presenting the item image 380 for an item for an item that is part of the customer order, but has not yet been acquired by the picker.

The item description area 330 presents an item description of the item. The item description is for the item displayed in the item display area 320. The item description includes, e.g., a name of the item, a size of the item, and a requested quantity of the item.

The item location area 340 presents an expected location of the item. For example, the item location area 340 may include a map of a retailer and indicate an expected location of the item on the map. In some embodiments, the map may also include a real-time location of the picker.

The price area 350 presents a price for the item. In some embodiments, the price shown in the price area 350 is the expected price for the item. If the expected price differs from an actual price of the item, the picker may, e.g., contact the customer to see if the customer wants the picker to proceed with the item, instead select a substitute item, cancel the order for the item, etc.

As described above with regard to, e.g., FIGS. 1 and 2, an alert may be generated for some items (e.g., those having a relatively high risk of resulting in a customer complaint). As such, a number of alerts for an order may vary and, in some cases, may be zero. In FIG. 3, the item has an associated alert. Accordingly, the collection interface 300 presents the alert area 360. The alert area 360 presents a message (e.g., a message 390) associated with an item. In some embodiments, the picker client device may present the alert via the alert area 360 once the collection interface 300 presents information for the item having the alert. In other embodiments, the picker client device may delay having the alert area 360 present the alert until one or more presentation criteria has been met (e.g., the picker is within a threshold distance of the location where the item is located). The presented message 390 of the alert is tailored to one or more types of issues associated with the item. For example, the item in FIG. 3 is a bottle of milk. This item has an expiration date and can potentially be spoiled. Accordingly, the presented message 390 is, "Make sure it's not expired, rotten, or spoiled." In some embodiments, the presentation of the message 390 within the alert area 360 may be emphasized by, e.g., an accompanying sound presented by the picker client device, accompanying haptic feedback presented by the picker client device, emphasized font in the message 390 (e.g., via color, size, highlight, bold, underline, etc.) or some combination thereof.

In one or more embodiments, a large language model (LLM) is used to generate alerts. For example, the LLM may be prompted to generate a message that describes a typical user complaint about a type of item that is being picked. In one or more embodiments, to use the LLM to generate text for an alert, historical user instructions are logged for each item type or category. These logged user instructions are processed to remove messages that containing keyword that are less likely to contain useful feedback about picking an item. For example, words like "refund," "substitution," etc. are less likely to contain meaningful instructions and may this signal logged user instructions that should be removed. The LLM is then prompted to generate one or more instructions for picking an item of a type that corresponds to the item being picked, where the prompt provided to the LLM includes example instructions from the curated, logged user instructions. The instructions generated by the LLM may be manually reviewed to eliminate user-specific preferences that may not be broadly relevant and to ensure adherence to a set of policy guidelines.

In the illustrated embodiment, the soft button 370 is an interface through which the picker can notify the picker client device 110 that the item has been selected by the picker. For example, the soft button 370 says, "Found Item." Once selected, the picker client device 110 logs the item as being acquired, and the collection interface 300 presents information for the next item in the order. In other embodiments, the soft button 370 may present some other text to the picker.

Note in the illustrated embodiment, the collection interface 300 is presenting information for an item that is part of the customer order, but has not yet been acquired by the picker. As such, the collection interface 300 as shown is for a particular operational stage (e.g., picker shopping). While not shown, for some embodiments that occur in different operational stages (e.g., picker delivery), the picker client device may present similar interfaces that are modified to reflect the operational stage. For example, during delivery, the picker client device may present a map showing a delivery location, and the map may also include a location of the picker client device. The picker client device may also include an alert area for providing alerts during these other operational stages. For example, an alert area may include a message to the picker (e.g., "Make sure to include oversized items that are not in the bag") and presentation of the message may be emphasized in some manner. In some embodiments, presentation of the alert may also be accompanied by an item image of the item in an item display area. As such, a picker client device may present alerts to the picker for various operational stages.

Figure 4:
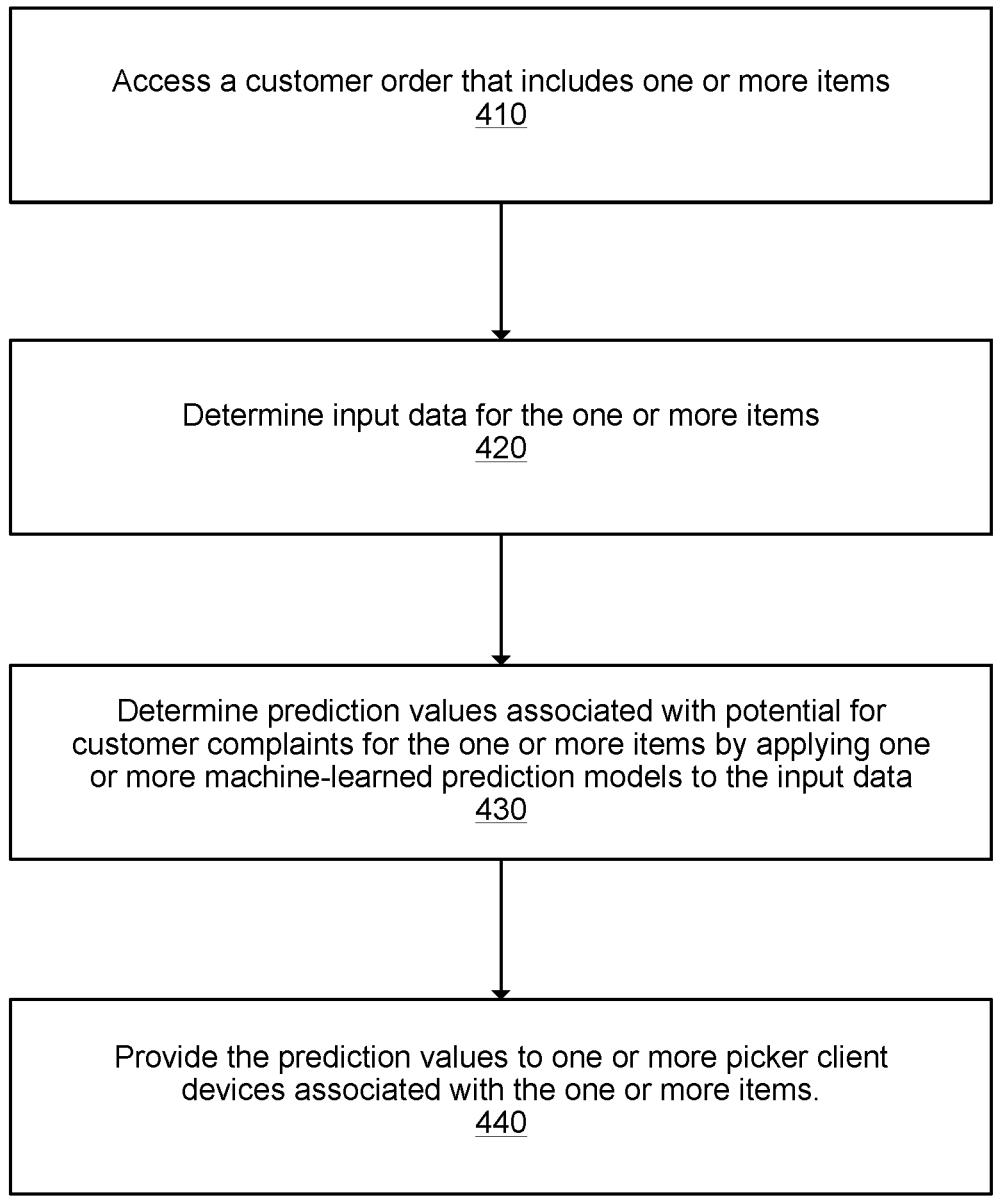
FIG. 4 is a flowchart for a method of using a machine-learned prediction model to predict chances of customer complaints that are associated with one or more items on a customer order, in accordance with some embodiments.

FIG. 4 is a flowchart for a method of using a machine-learned prediction model to predict chances of customer complaints that are associated with one or more items on a customer order, in accordance with some embodiments. Alternative embodiments may include more, fewer, or different steps from those illustrated in FIG. 4, and the steps may be performed in a different order from that illustrated in FIG. 4. These steps may be performed by an online concierge system (e.g., online concierge system 140). Additionally, each of these steps may be performed automatically by the online concierge system without human intervention.

The online concierge system accesses 410 a customer order that includes one or more items. The customer order may be associated with a single picker client device. In some embodiments, the customer order may be divided into different portions that are each assigned to different picker client devices.

The online concierge system determines 420 input data for the one or more items. The online concierge system may determine item data (e.g., a type of input data) for the one or more items using, e.g., item data stored in a data store (e.g., the data store 240). The online concierge system may use the item data (e.g., identifiers for the one or more items) to retrieve (e.g., from the data store) other input data. The online concierge system may also determine an identifier for the picker, an identifier for the customer, or both from the customer order. Using one or both of the determined identifiers, the online concierge system may retrieve additional customer data, additional picker data, or some combination thereof, from the data store.

The online concierge system determines 430 prediction values associated with potential for customer complaints for the one or more items by applying one or more machine-learned prediction models to the input data. For example, the online concierge system may apply the one or more machine-learned prediction models to input data for an item to generate one or more prediction values for the item. In some embodiments, a single prediction value is generated for the item. In other embodiments, multiple prediction values for the item are generated (e.g., for different types of issues).

The online concierge system provides 440 the prediction values to one or more picker client devices associated with the one or more items. The online concierge system may provide to the one or more picker client devices the prediction values for items in serial (e.g., as a function of a user's location, next item on the order to select), in batch (multiple prediction values received together), or some combination thereof. In some embodiments, the online concierge system may also provide thresholds for items and/or messages for alerts to the one or more picker client devices. The online concierge system may provide the prediction values to the one or more picker client devices via a network (e.g., the network 130).

Figure 5:
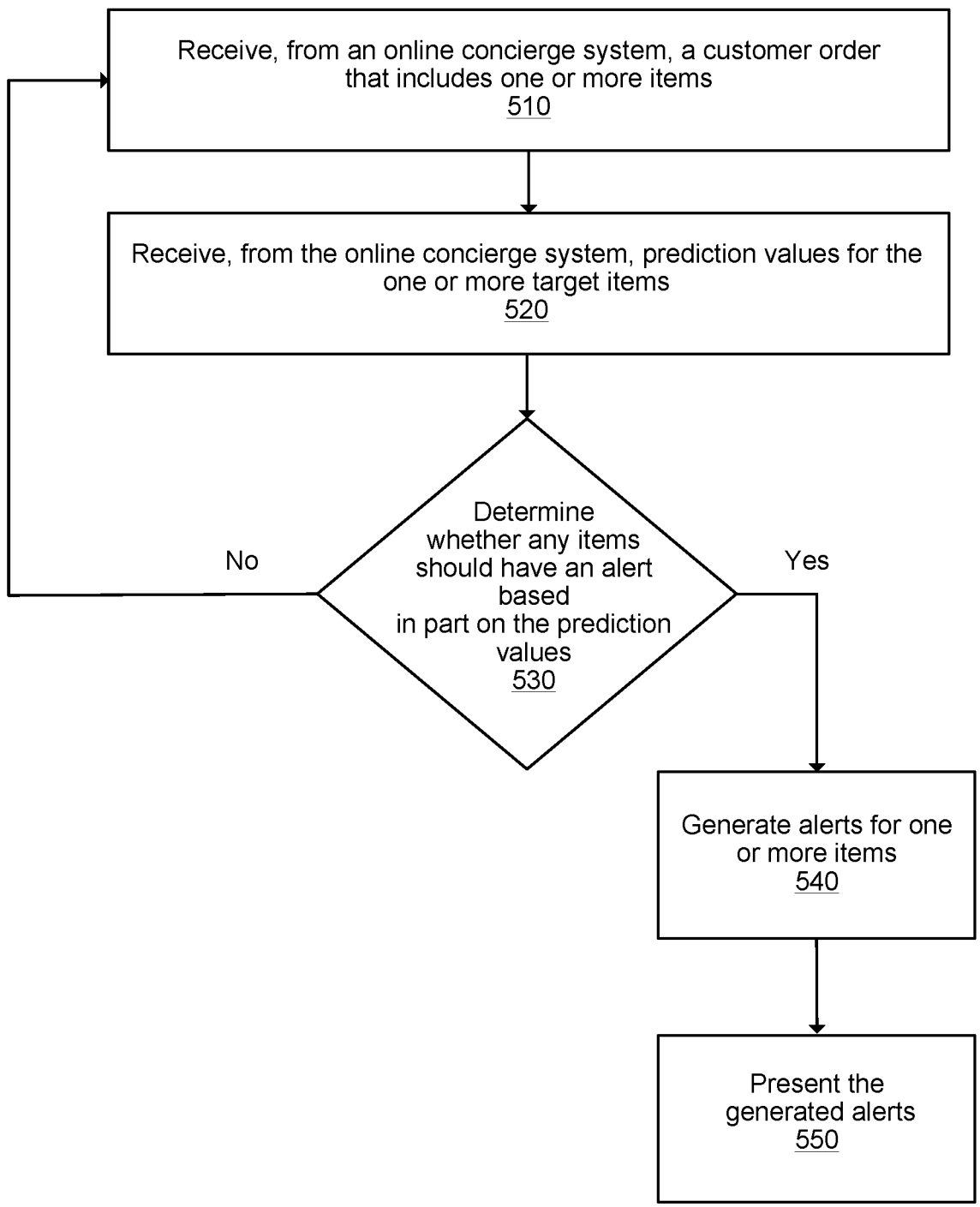
FIG. 5 is a flowchart for a method for presenting alerts on a picker client device, in accordance with some embodiments.

FIG. 5 is a flowchart for a method presenting alerts on a picker client device, in accordance with some embodiments. Alternative embodiments may include more, fewer, or different steps from those illustrated in FIG. 5, and the steps may be performed in a different order from that illustrated in FIG. 5. These steps may be performed by a picker client device (e.g., picker client device 110). Additionally, each of these steps may be performed automatically by the picker client device without human intervention.

The picker client device receives 510, from an online concierge system (e.g., the online concierge system 140), a customer order that includes one or more items. The picker client device receives the customer order from the online concierge system via a network (e.g., the network 130). In some embodiments, the received customer order is part of a larger order that has been divided among a plurality of pickers to fulfill.

The picker client device receives 520, from the online concierge system, prediction values for the one or more items. The picker client device receives the prediction values from the online concierge system via the network. In some embodiments, there is at least one prediction value for at least every item of the one or more items. In some embodiments, for a given item of the one or more items, there is a separate prediction value for each type of issue associated with the given item.

The picker client device determines 530 whether any items should have an alert based in part on the prediction values. The picker client device (e.g., using a quality alert module) may compare, for each item with at least one received prediction value, the at least one prediction value for the item against a corresponding threshold value for the item. In some embodiments, if the prediction value exceeds the corresponding threshold value, the picker client device determines that an alert should be presented for the item. Note that while the comparison is described in the context of a prediction value exceeding a corresponding threshold value, in other embodiments, the comparison may have different conditions to indicate that an alert should be provided for an item. For example, instead of a prediction value exceeding the corresponding threshold value to determine that an alert should be presented, the prediction value could equal or exceed the corresponding threshold value to determine that an alert should be presented. In embodiments, where the picker client device determines that no items should have an alert, the process flow moves to 510 and repeats for a different customer order.

The picker client device generates 540 alerts of one or more of the items. The picker client device (e.g., using the quality alert module) generates alerts for any items the picker client device determined should have an alert. In some embodiments, the picker client device selects a message from a plurality of messages (e.g., customized for different types of issues (e.g., wrong item)). The selection may be based on, e.g., the type of issue (e.g., item missing, wrong item, etc.) associated with the item. In some embodiments, a message to include in an alert for an item is received from the online concierge system.

The picker client device presents 550 the generated alerts. In some embodiments, the picker client device automatically presents the generated alert (e.g., as part of the collection interface). In other embodiments, if the picker client device determines an alert should be presented, the quality alert module determines whether one or more presentation criteria are satisfied for the item, and once satisfied instructs the picker client device to present the generated alert for the item. In this manner, the picker client device can provide an alert to its picker at a time when the alert likely would be most relevant to the picker. For example, the picker client device may delay presenting an alert for an item until the picker client device starts to route the picker to that item for selection.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model,"

as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer program product comprising a non-transitory computer readable storage medium having instructions encoded thereon that, when executed by a processor of a computer system, cause the processor to perform steps comprising:
    accessing a customer order that includes one or more items;
    determining input data for an item of the one or more items;
    determining, by the computer system, a prediction value associated with potential for a customer complaint for the item by the computer system applying a machine-learned prediction model to the input data, wherein the machine-learned prediction model was trained by:
        accessing a training data set including item identifiers for a plurality of items including the item and instances of customer complaint for the plurality of items,
        applying the machine-learned prediction model to the training data to generate a training output,
        backpropagating one or more error terms obtained from one or more loss functions to update a set of parameters of the machine-learned prediction model based, and one or more of the error terms are based on a difference between a label applied to an item of the training data and a predicted probability of receiving a customer complaint for that item, and
        stopping the backpropagation after the one or more loss functions satisfy one or more criteria; and
    providing the prediction value to a picker client device associated with the item, wherein providing the prediction value to the picker client device causes the picker client device to present an alert, and wherein the alert includes a message that is customized to mitigate a cause of potential customer complaint for the item.

2. The computer program product of claim 1, wherein determining input data associated with the item comprises determining an item identifier that identifies characteristics of the item, a customer identifier that identifies characteristics of a customer associated with a client device that provided the customer order, and a picker identifier that identifies characteristics of the picker.

3. The computer program product of claim 2, wherein the training data set used to train the machine-learned prediction model includes item identifiers that identify respective characteristics of the plurality of items, customer identifiers that identify respective characteristics of customers, and picker identifiers that identify characteristics of pickers.

4. The computer program product of claim 1, the non-transitory computer readable storage medium having additional instructions encoded thereon that, when executed by the processor, cause the processor to perform steps comprising:
    selecting a message from a plurality of message types based in part on a type of issue associated with the item; and
    providing the selected message to the picker client device.

5. The computer program product of claim 4, wherein the type of issue is one or more of: item missing, wrong item, poor replacement, rotten, expired, damaged, temperature spoiled, or uncategorized.

6. The computer program product of claim 1, the non-transitory computer readable storage medium having additional instructions encoded thereon that, when executed by the processor, cause the processor to perform steps comprising:
    determining a type of issue associated with the item; and
    selecting the machine-learned prediction model associated with the determined type of issue from a plurality of machine-learned prediction models that are associated with different types of issues.

7. The computer program product of claim 1, wherein the machine-learned prediction model is further trained using one or more guardrail metrics associated with the plurality of items, wherein a guardrail metric includes mean picking time per order.

8. The computer program product of claim 1, wherein providing the prediction value to the picker client device is responsive to the prediction value exceeding a threshold value.

9. The computer program product of claim 8, wherein providing the prediction value to the picker client device further comprises, responsive to the prediction value exceeding the threshold value, the picker client device selects the message from a plurality of messages.

10. A method, performed at a computer system comprising a processor and a non-transitory computer readable medium, comprising:

accessing a customer order that includes one or more items;

determining input data for an item of the one or more items;

determining, by the computer system, a prediction value associated with potential for customer complaint for the item by the computer system applying a machine-learned prediction model to the input data, wherein the machine-learned prediction model was trained by:

accessing a training data set including item identifiers for a plurality of items including the item and instances of customer complaint for the plurality of items, backpropagating one or more error terms obtained from one or more loss functions to update a set of parameters of the machine-learned prediction model based, and one or more of the error terms are based on a difference between a label applied to an item of the training data and a predicted probability of receiving a customer complaint for that item, and stopping the backpropagation after the one or more loss functions satisfy one or more criteria; and providing the prediction value to a picker client device associated with the item, wherein providing the prediction value to the picker client device causes the picker client device to present an alert, and wherein the alert includes a message that is customized to mitigate a cause of potential customer complaint for the item.

11. The method of claim 10, wherein determining input data associated with the item comprises determining an item identifier that identifies characteristics of the item, a customer identifier that identifies characteristics of a customer associated with a client device that provided the customer order, and a picker identifier that identifies characteristics of the picker.

12. The method of claim 11, wherein the training data set used to train the machine-learned prediction model include item identifiers that identify respective characteristics of the plurality of items, customer identifiers that identify respective characteristics of customers, and picker identifiers that identify characteristics of pickers.

13. The method of claim 10, further comprising:
selecting a message from a plurality of message types based in part on a type of issue associated with the item; and
providing the selected message to the picker client device.

14. The method of claim 13, wherein the type of issue is one or more of: item missing, wrong item, poor replacement, rotten, expired, damaged, temperature spoiled, or uncategorized.

15. The method of claim 10, further comprising:
determining a type of issue associated with the item; and
selecting the machine-learned prediction model associated with the determined type of issue from a plurality of machine-learned prediction models that are associated with different types of issues.

16. The method of claim 10, wherein the machine-learned prediction model is further trained using one or more guardrail metrics associated with the plurality of items, wherein a guardrail metric includes mean picking time per order.

17. The method of claim 10, wherein providing the prediction value to the picker client device comprises, responsive to the prediction value exceeding a threshold value, causing the picker client device is configured to present the alert to the picker.

18. The method of claim 17, wherein providing the prediction value to the picker client device is responsive to the prediction value exceeding a threshold value.

19. The method of claim 10, wherein providing the prediction value to the picker client device comprises causing the picker client device to select a time to present the alert based in part on a location of the picker client device.

20. A computer system comprising:
a processor; and
a non-transitory computer readable storage medium having instructions encoded thereon that, when executed by the processor, cause the processor to perform steps comprising:

accessing a customer order that includes one or more items, determining input data for an item of the one or more items, determining, by the computer system, a prediction value associated with potential for customer complaint for the item by the computer system applying a machine-learned prediction model to the input data, wherein the machine-learned prediction model was trained by:

accessing a training data set including item identifiers for a plurality of items including the item and instances of customer complaint for the plurality of items, applying the machine-learned prediction model to the training data to generate a training output, backpropagating one or more error terms obtained from one or more loss functions to update a set of parameters of the machine-learned prediction model based, and one or more of the error terms are based on a difference between a label applied to an item of the training data and a predicted probability of receiving a customer complaint for that item, and stopping the backpropagation after the one or more loss functions satisfy one or more criteria; and providing the prediction value to a picker client device associated with the item, wherein providing the prediction value to the picker client device causes the picker client device to present an alert, and wherein the alert includes a message that is customized to mitigate a cause of potential customer complaint for the item.

* * * * *